US009703923B2

(12) United States Patent
Ravindranath et al.

(10) Patent No.: US 9,703,923 B2
(45) Date of Patent: *Jul. 11, 2017

(54) TIMING CONSTRAINTS FORMULATION FOR HIGHLY REPLICATED DESIGN MODULES

(71) Applicant: International Business Machines Corporation, Armonk, NY (US)

(72) Inventors: Chithra Ravindranath, Bangalore (IN); Sourav Saha, Kolkata (IN); Rajashree Srinidhi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,607

(22) Filed: Dec. 12, 2016

(65) Prior Publication Data

US 2017/0083662 A1    Mar. 23, 2017

Related U.S. Application Data

(63) Continuation of application No. 15/094,090, filed on Apr. 8, 2016, now Pat. No. 9,576,102, which is a continuation of application No. 14/837,050, filed on Aug. 27, 2015.

(51) Int. Cl.
    *G06F 17/50*    (2006.01)
(52) U.S. Cl.
    CPC ...... *G06F 17/5081* (2013.01); *G06F 17/5072* (2013.01); *G06F 17/5031* (2013.01); *G06F 17/5077* (2013.01); *G06F 2217/06* (2013.01); *G06F 2217/84* (2013.01)
(58) Field of Classification Search
    CPC ............. G06F 17/5072; G06F 17/5081; G06F 17/5077; G06F 17/5031; G06F 2217/84

USPC ....... 716/122, 123, 124, 125, 113, 129, 130, 716/131, 134; 703/16
    See application file for complete search history.

(56) References Cited

U.S. PATENT DOCUMENTS

| 7,124,380 | B2 | 10/2006 | Keller et al. |
| 7,451,412 | B2 | 11/2008 | Jones et al. |
| 7,971,168 | B1 | 6/2011 | Swanson et al. |
| 7,984,415 | B1 | 7/2011 | Srinivasan |
| 8,407,650 | B1 | 3/2013 | Avidan et al. |
| 8,448,113 | B2 | 5/2013 | Amundson et al. |
| 8,566,765 | B1 | 10/2013 | Tzeng |

(Continued)

FOREIGN PATENT DOCUMENTS

WO    2014106099 A1    7/2014

OTHER PUBLICATIONS

Marinova-Boncheva, Vera; "Using the Agglomerative Method of Hierarchical Clustering as a Data Mining Tool in Capital Market"; International Journal "Information Theories & Applications"; 2008; pp. 382-386; vol. 15.

(Continued)

*Primary Examiner* — Phallaka Kik
(74) *Attorney, Agent, or Firm* — Brian M. Restauro (57) ABSTRACT

Embodiments of the present invention provide efficient systems and methods for creating an optimal set of partitions across replica blocks using two checkpoints during the design process. The two checkpoints group a set of macros according to a timing constraint and a location proximity to the other macros. Clustering of the macros is iteratively performed until a distance parameter exceeds a pre-defined threshold.

1 Claim, 6 Drawing Sheets

(56) References Cited

U.S. PATENT DOCUMENTS

| | | |
|---|---|---|
| 2002/0060318 A1 | 5/2002 | Katz |
| 2007/0245281 A1 | 10/2007 | Riepe et al. |
| 2011/0265053 A1 | 10/2011 | Ishikawa |
| 2013/0055187 A1 | 2/2013 | Hiromitsu |
| 2013/0227511 A1 | 8/2013 | Avidan et al. |

OTHER PUBLICATIONS

Ravindranath et al.; U.S. Appl. No. 14/837,050, filed Aug. 27, 2015; Entitled "Timing Constraints Formulation for Highly Replicated Design Modules"; pp. 1-20.

Ravindranath et al.; U.S. Appl. No. 15/094,090, filed Apr. 8, 2016; Entitled "Timing Constraints Formulation for Highly Replicated Design Modules"; pp. 1-16.

Ravindranath et al.; U.S. Appl. No. 15/375,677, filed Dec. 12, 2016; Entitled "Timing Constraints Formulation for Highly Replicated Design Modules"; pp. 1-16.

IBM Appendix P, "IBM Patents or Patent Applications to Be Treated as Related", Dated Dec. 12, 2016, 2 pages.

TIMING CONSTRAINTS FORMULATION FOR HIGHLY REPLICATED DESIGN MODULES

BACKGROUND OF THE INVENTION

The present invention relates generally to the field of chip design, and more particularly to timing constraint formulation for highly replicated design modules.

Current state-of-the art processor design often contains heavily replicated design modules at the chip or chiplet level, and can reach a replication count of over 50. Conventional timing closure methodologies use worst case boundary timing constraints during the design construction process (i.e., synthesis, place-n-route). Because of many different design scenarios and constraints (e.g., floorplanning, wiring congestion, parent level buffering, boundary port locations), different replicas of the same module can be subjected to significantly different design requirements.

SUMMARY

According to an embodiment of the present invention, a method for managing time constraints in a circuit is provided, the method comprising: creating a placement design in a circuit; determining, by one or more processors, whether a first criteria is met, wherein the first criteria comprises a first predefined threshold; in response to determining that a first criteria is met, initiating, by one or more processors, a first checkpoint procedure; determining, by one or more processors, whether a second criteria is met, wherein the second criteria comprises a second predefined threshold; and in response to determining that the second criteria is met, initiating, by one or more processors, a second checkpoint procedure.

According to another embodiment of the present invention, a computer program product for managing time constraints in a circuit is provided, the computer program product comprising: a computer readable storage medium and program instructions stored on the computer readable storage medium, the program instructions comprising: program instructions to create a placement design in a circuit; program instructions to determine whether a first criteria is met, wherein the first criteria comprises a first predefined threshold; program instructions to, in response to determining that a first criteria is met, initiate a first checkpoint procedure; program instructions to determine whether a second criteria is met, wherein the second criteria comprises a second predefined threshold; and program instructions to, in response to determining that the second criteria is met, initiate a second checkpoint procedure.

According to another embodiment of the present invention, a computer system for managing time constraints in a circuit is provided, the system comprising: one or more computer processors; one or more computer readable storage media; program instructions stored on the one or more computer readable storage media for execution by at least one of the one or more processors, the program instructions comprising: program instructions to create a placement design in a circuit; program instructions to determine whether a first criteria is met, wherein the first criteria comprises a first predefined threshold; program instructions to, in response to determining that a first criteria is met, initiate a first checkpoint procedure; program instructions to determine whether a second criteria is met, wherein the second criteria comprises a second predefined threshold; and program instructions to, in response to determining that the second criteria is met, initiate a second checkpoint procedure.

DETAILED DESCRIPTION

Current state-of-the art processor design often contains heavily replicated design modules at the chip or chiplet level. Embodiments of the present invention provide methods and systems for creating an optimal set of partitions across replica blocks, treating each replica block as unique entities which are optimized differently during the construction phase. A statistical distribution model is implemented to create the partitions based on the selected parameters, wherein the partitions have similar boundary constraints and thus, power performance is optimized. Embodiments of the present invention can be applied to processors, as well as, various other application-specific integrated circuits (ASICs), system-on-chips (SoCs), and other memory chips, where there is a possibility of occurrence of highly replicated designs.

Figure 1A:
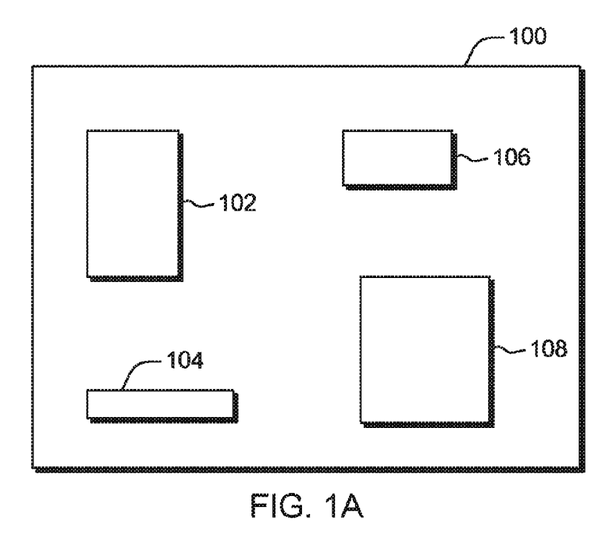
FIG. 1A depicts a block diagram of a chip with block layout, in accordance with an embodiment of the present invention.

The present invention will now be described in detail with reference to the Figures. FIG. 1A depicts a block diagram of a chip 100 with a block layout, in accordance with an embodiment of the present invention. Modifications to chip 100 may be made by those skilled in the art without departing from the scope of the invention as recited by the claims. In an exemplary embodiment, chip 100 includes blocks 102, 104, 106, and 108, which are representative of heavily replicated macros on chip 100. Each of blocks 102, 104, 106, and 108 may be placed in different locations on different chips, and thus a disparity may exist between the replicated macros between multiple chips.

Figure 1B:
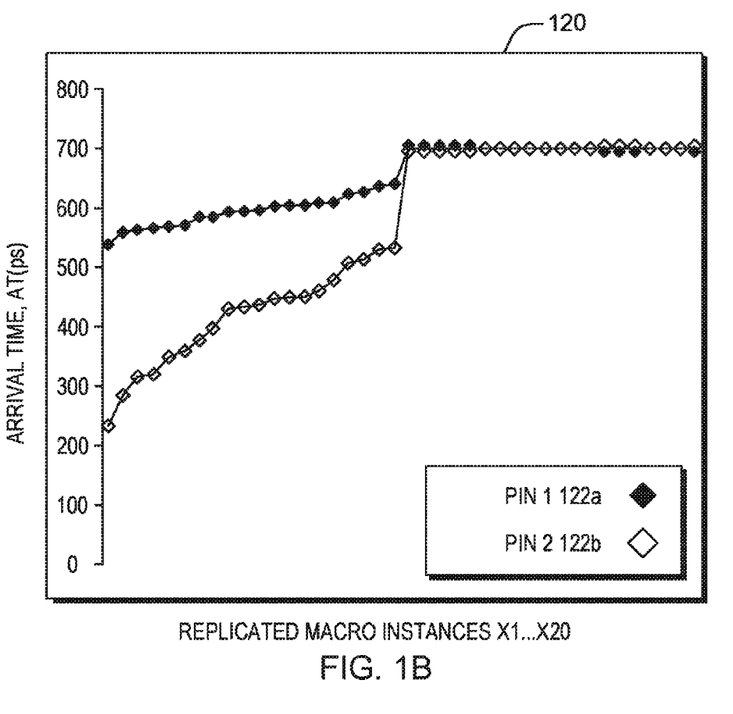
FIG. 1B depicts an example graph showing the variation in data arrival time for an input pin, in accordance with an embodiment of the present invention.

FIG. 1B depicts an example graph showing the variation in data arrival time for an input pin, in accordance with an embodiment of the present invention. Graph 120 depicts the variation in data arrival time (AT) for the same input pin 122A and 122B, for a heavily replicated macro. As seen in graph 120, there is a disparity in the data arrival time for many of the replicated macro instances (i.e., X1 through X20), showing that the timing constraints are different for these heavily replicated macros for the same input pin.

Figure 2A:
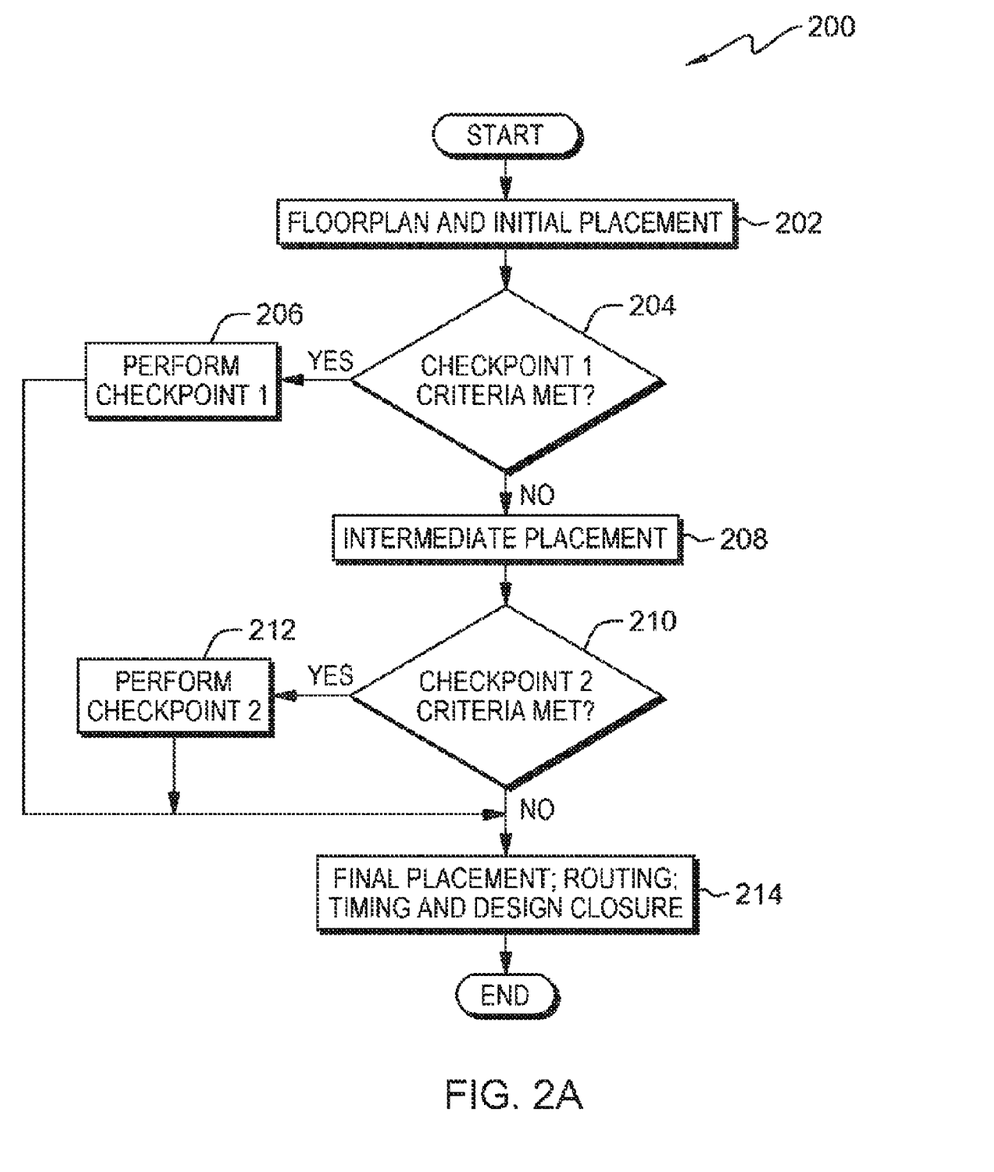
FIG. 2A depicts a flowchart illustrating operational steps of timing closure for multi-instance modules (MIMs), in accordance with an embodiment of the present invention.

FIG. 2A depicts flowchart 200 illustrating operational steps of timing closure for multi-instance modules (MIMs), in accordance with an embodiment of the present invention.

In step 202, initial floorplanning and IP placement is performed. Initial floorplanning refers to a set of activities in which different participating blocks or modules are assigned initial area budget, aspect ratios, etc., as well as, deciding their relative location and whitespace around them. There are many ways to decide this. For example, it can be based on a micro-architectural or a critical path timing requirement or on connection density, or a combination of both, using a weighted cost function. Certain blocks are tagged as soft, which indicates they are open to additional refinement in subsequent iterations, while other blocks are tagged as hard or locked, which indicates they cannot be altered because of technical reasons.

In step 204, it is determined whether the checkpoint 1 criteria is met. The checkpoint 1 criteria is met when a certain design parameters are at a predefined threshold. If the checkpoint 1 threshold criteria is met, then, in step 206, a first checkpoint is initiated and performed. This first checkpoint allows the designer to have greater flexibility to arrive at a better clustering of MIMs in the early stages of chip design. The first checkpoint is described in more detail with respect to FIG. 2B.

If a certain threshold criteria is not met, then in step 208, an intermediate placement occurs. Placement in general can be a complex step-by-step iterative process, in which many underlying CAD algorithms are performed to guide a design into convergence and to meet a set of design criteria. Intermediate placement refers to one internal step (of the many iterations) in which design comes close (i.e., within a specified percentage) to a final optimized state.

In step 210, it is determined whether the checkpoint 2 criteria is met. The checkpoint 2 criteria is met when certain design parameters are within a predefined, specific threshold. If the checkpoint 2 threshold criteria is met, then, in step 212, a second checkpoint is initiated and performed. The second checkpoint is executed after the final floorplanning, when certain design parameters are within a specific threshold, where the design cycle is short and/or the design is in a state of re-use, or where re-floorplanning is less likely to occur. The second checkpoint is described in more detail with respect to FIG. 2C.

If a certain threshold criteria is not met, then in step 214, final placement, routing, and the timing and design closure occurs. After the intermediate placement step (i.e., step 208), a few more design iterations and fine grain adjustments are performed to reach the final optimized state. These adjustments/iterations may include a detailed routability metrics evaluation, a buffering update, clocking and power related checks, and a fix-up of reliability issues.

Figure 2B:
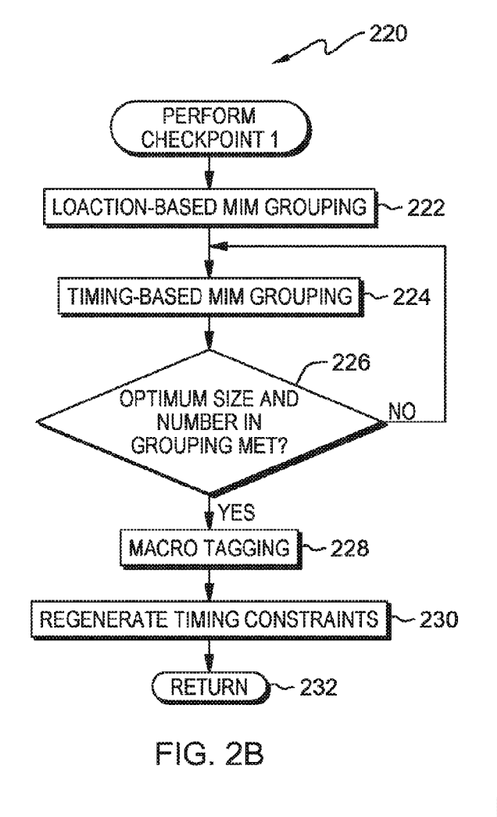
FIG. 2B depicts a flowchart illustrating operational steps of a first checkpoint, in accordance with an embodiment of the present invention.

FIG. 2B depicts flowchart 220 illustrating operational steps of a first checkpoint, in accordance with an embodiment of the present invention. The first checkpoint is a two pass flow, in which a first pass grouping is based on the location of MIMs and a second pass grouping is based on the timing.

In step 222, location-based MIM grouping occurs. In this exemplary embodiment, during a first pass grouping, groups of macros are formed based on their location proximity to each other. Clustering of the macros is iteratively performed, until the distance parameter exceeds a pre-determined threshold. Location-based MIM grouping is described in further detail with respect to FIGS. 3A-D.

In step 224, timing-based MIM grouping occurs. In this exemplary embodiment, during a second pass grouping, pin-list filtering is performed to eliminate common, non-critical signal pins (e.g., test/scan related) from each MIM's pin list, in order to generate a shortened pin list. Following this, timing-based grouping is done using statistical analysis of the ATs/ETAs of each pin, for each MIM which is similar to checkpoint 2.

In step 226, it is determined whether an optimum size and number in the grouping is met. In order to determine whether an optimum size and number of MIM groups are met, a calculation based on MIM groupings is performed, in which each MIM is initially grouped by itself and then nearest in distance pairs of MIMs are further merged into groups. When determining an optimal size and number of MIM groups, a few considerations are taken into account. For example, the cost is applied for merging the nearest neighboring instances of MIMs, the nearness of MIMs for grouping factors in physical distance, local density, and timing slack at each pin is considered, and based on the cost of merging the MIMs, thresholds are set for the size and number of MIM groups. An example of MIM grouping is depicted further with respect to FIGS. 3A-D.

If, in step 226, an optimum size and number in the grouping is met (i.e., the determined threshold), then, in step 228, macro tagging is performed. After a new group is generated, the MIMs are tagged in the design netlist/layout based on the group to which each MIM belongs.

Figure 4:
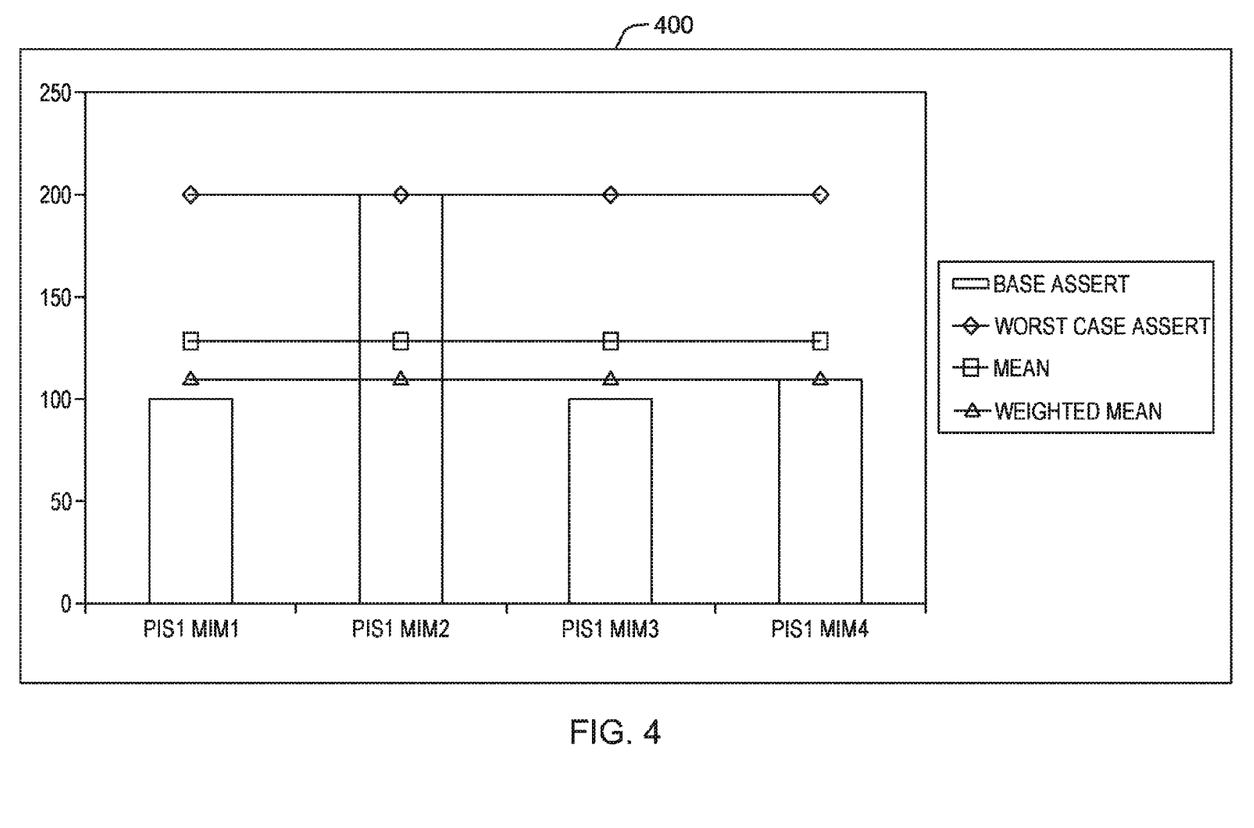
FIG. 4 depicts an example of a graph depicting the calculated weighted mean for each MIM, in accordance with an illustrative embodiment of the present invention.

In step 230, timing constraints are regenerated. In this exemplary embodiment, new timing constraints for each group are derived by calculating the weighted mean of each pin's AT. For example, the sum of the PIS/ETA values can be written as:

$$N=\{n_1, n_2, n_2', n_2'', n_2''', n_3, n_3', n_3'', n_4, \ldots n_n\} \quad \text{(Eq. 1)}$$

where n denotes different PIS/ETA values. The new weighted mean timing constraint for $n_2$ can then be written as:

$$\frac{W_1 * n_2 + W_2 * n_2' + W_3 * n_2'' + W_4 * n_2'''}{\sum W_n} \quad \text{(Eq. 2)}$$

where $W_n$, the weight, is the number of occurrences of each PIS/ETA (i.e., within a given cluster). This implementation is depicted in further detail with respect to FIG. 4.

In step 232, the operational steps return to step 214 of FIG. 2A.

Figure 2C:
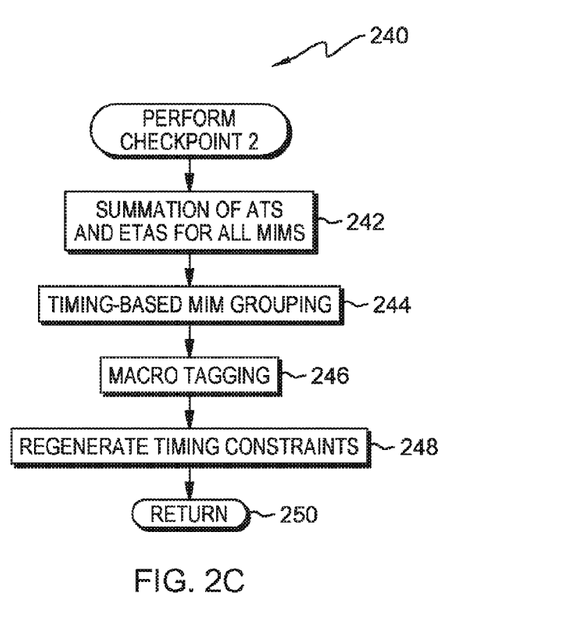
FIG. 2C depicts a flowchart illustrating operational steps of a second checkpoint, in accordance with an embodiment of the present invention.

FIG. 2C depicts flowchart 240 illustrating operational steps of a second checkpoint, in accordance with an embodiment of the present invention.

In step 242, summation of the arrival times (ATs) and expected time of arrival (ETA) is gathered for all MIMs. In this exemplary embodiment, pin-list filtering is done to eliminate common, non-critical signal pins (e.g., test/scan related) from each MIM's pin list, in order to generate a reduced I/O pin list. Following this, a summation of the ATs and the ETAs is created for the reduced pin list. Both the mean (i.e., average) and standard deviation of the summed ATs are calculated.

In step 244, timing-based MIM grouping is performed. The MIMs are grouped based on the calculated mean and standard deviation of the summed ATs. For example, MIMs with the mean summed ATs may fall into a 'normal variant group', while MIMs with a higher standard deviation from the mean of summed ATs may fall into a 'high variant group', and MIMs with a lower standard deviation from the mean of summed ATs may fall into a 'low variant group.' If contention occurs because MIMs belong to one variant group based on AT, and belong to a different variant group based on ETA, then the probability of occurrence decides which group will take precedence.

In step 246, macro tagging is performed. Once the variant groups are determined, the MIMs are tagged in the design netlist/layout based on the determined group to which each belongs.

In step 248, timing constraints are regenerated in the same manner as described with regards to step 230 of FIG. 2B. This implementation is depicted in further detail with respect to FIG. 4.

In step 250, the operational steps return to step 214 of FIG. 2A.

FIGS. 3A-D depict examples of location-based grouping, in accordance with an embodiment of the present invention.

Figure 3A:
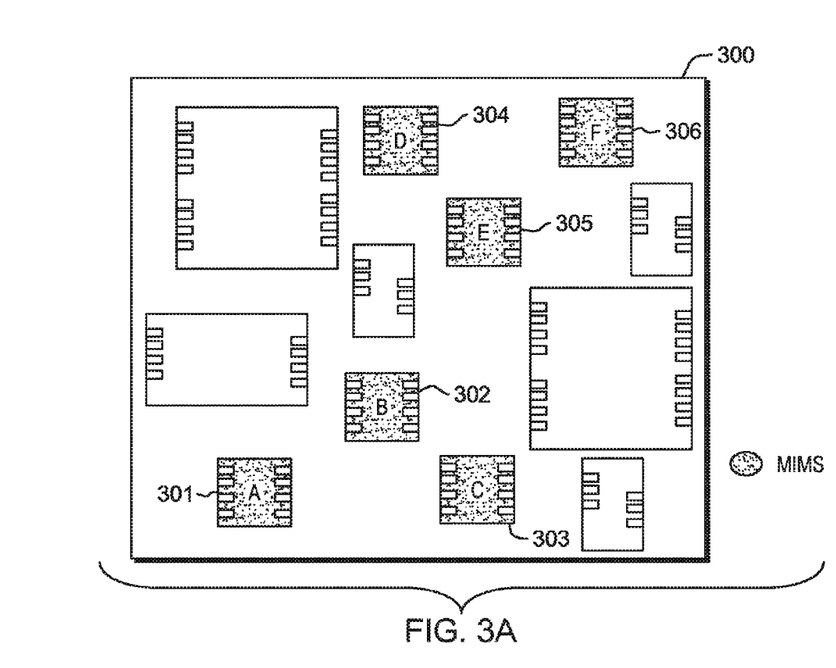
FIGS. 3A-D depict examples of location-based grouping, in accordance with an embodiment of the present invention.

Location-based grouping is implemented to determine the optimal size and number of MIM groups. FIG. 3A depicts an example chip 300 with multiple MIMs 301-306.

Figure 3B:
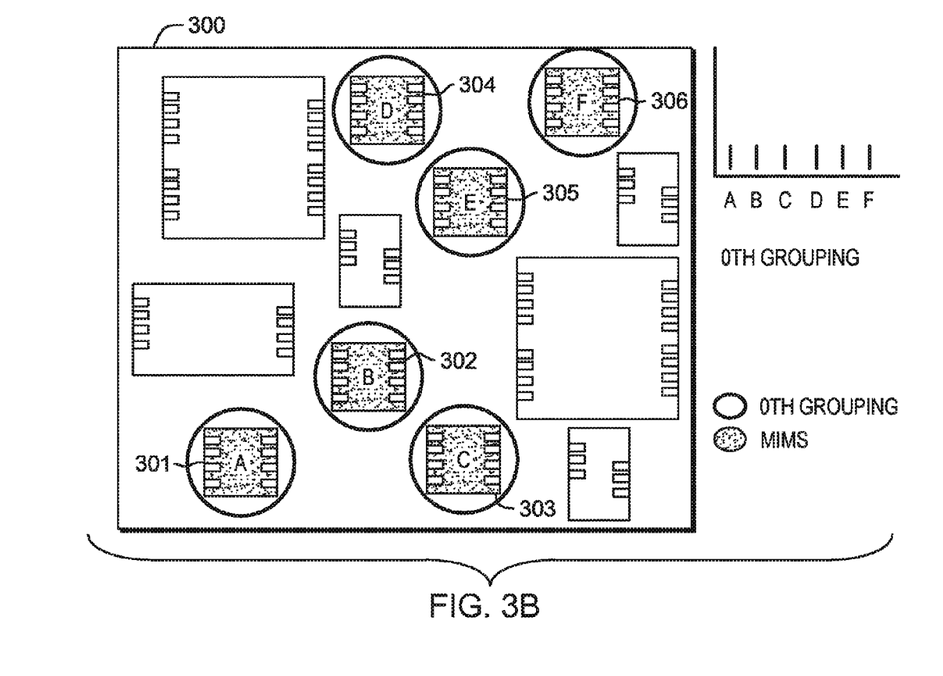

FIG. 3B depicts chip 300 with $0^{th}$ groupings depicted. In this exemplary embodiment, each of MIMs 301-306 is initially in a group by itself. For example, MIM 301 is in a separate grouping from MIM 302. A dendrogram is depicted showing each of MIMs 301-306 (i.e., A-F) in a separate grouping.

Figure 3C:
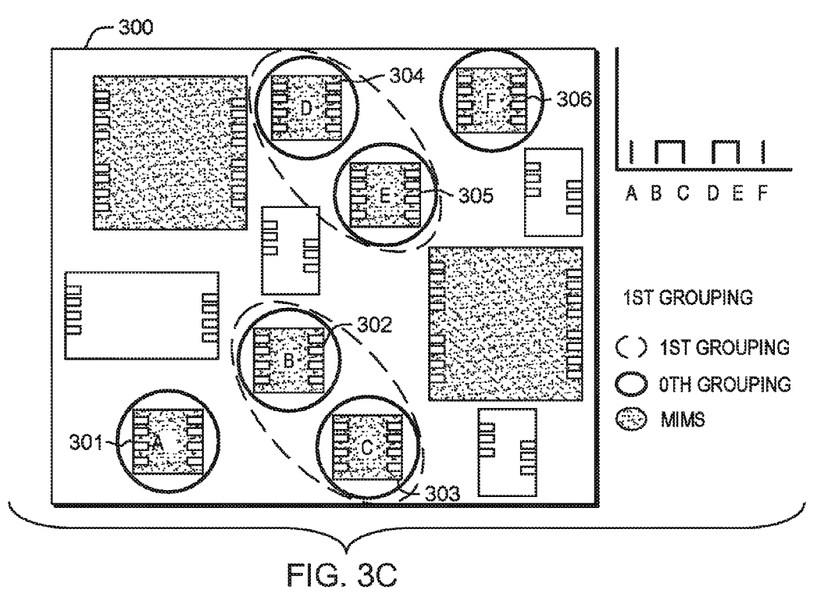

FIG. 3C depicts chip 300 with the $0^{th}$ and $1^{st}$ groupings depicted. In this exemplary embodiment, after each MIM is initially in its own group, the nearest (i.e., closest distance) pair of MIMs are then merged into a group. For example, MIMs 302 and 303 are merged into a $1^{st}$ grouping and MIMs 304 and 305 are merged into another 1st grouping. The dendrogram is updated to show that MIMs 302 and 303 (i.e., B and C) are now in a group and that MIMs 304 and 305 (i.e., D and E) are now in a group.

Figure 3D:
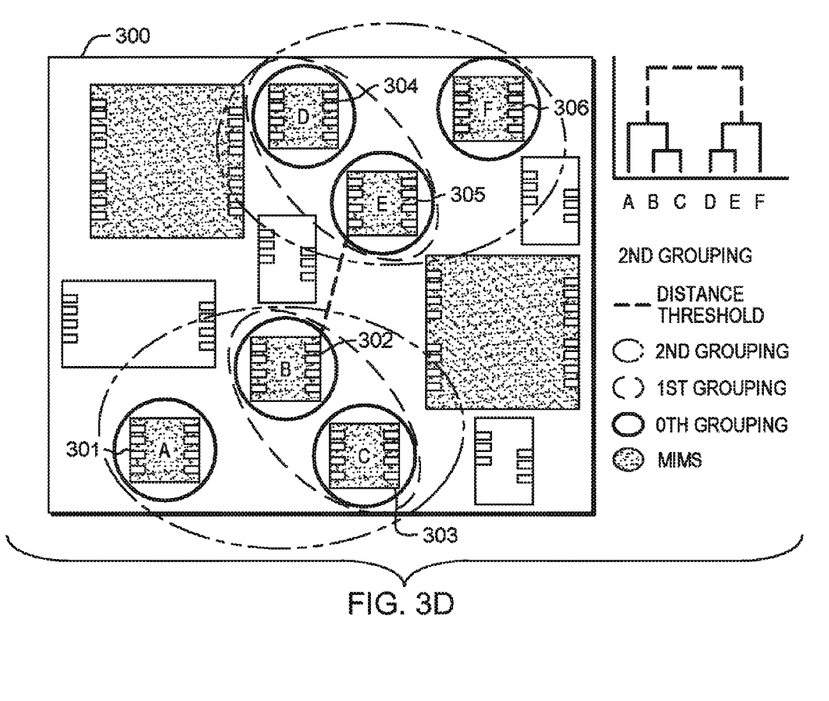

FIG. 3D depicts chip 300 with the $0^{th}$, $1^{st}$, and $2^{nd}$ groupings depicted. In this exemplary embodiment, after the MIMs are merged into a nearest group (i.e., $1^{th}$ grouping), the MIMs are then further merged into another group based on the nearest MIMs. For example, MIMs 301, 302, and 303 are merged into a $2^{nd}$ grouping and MIMs 304, 305, and 306 are merged into another $2^{nd}$ grouping. Within-in class variance and distance between class centroids are good metrics to determine the quality of clustering, as the implementation of the clustering method maintains the similarity of MIMs within each cluster. The determined distance threshold between the two groups of MIMs is depicted in FIG. 3D in the block diagram. The dendrogram of FIG. 3D is updated to show that MIMs 301, 302, and 303 (i.e., A, B, and C) are grouped together and that MIMs 304, 305, and 306 (i.e., D, E, and F) are grouped together. The distance threshold is also indicated in the dendrogram, showing that distance-based groupings continue to occur, until the distance threshold is met (i.e., height of dendrogram groupings reaches height of the distance threshold).

FIG. 4 depicts an example of a graph depicting the calculated weighted mean for each MIM, in accordance with an illustrative embodiment of the present invention.

Graph 400 depicts a comparison between a worst case assert, a mean, and the calculated weighted mean for four different MIMs, MIM1, MIM2, MIM3, and MIM4. The calculated weighted mean for each of MIMs 1, 3, and 4 is closer in value to the base assert than the values of the mean and the worst case assert for MIMS 1, 3, and 4. It is demonstrated that the calculated weighted mean is able to minimize the overall variations across the MIMS, as only MIM2 has a base assert which is much larger than the calculated weighted mean.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for managing time constraints in a circuit, the computer program product comprising:
   one or more non-transitory computer readable storage media and program instructions stored on the one or more non-transitory computer readable storage media, the program instructions comprising:
      program instructions to create an initial placement design in a circuit;
      program instructions to determine based on the created initial placement design whether a first criteria is met, wherein the first criteria comprises a design parameter at a first predefined threshold;
      program instructions to, in response to determining that the first criteria is met, initiate a first checkpoint procedure, wherein the first checkpoint procedure comprises a two-pass flow, in which:
         a first pass grouping based on a location of a group of macros and clustering of the group of macros is iteratively performed until a distance parameter exceeds a predetermined threshold; and
         a second pass grouping is based on a time constraint, wherein pin list filtering is performed to generate a first shortened pin list;
      program instructions to, in response to determining that a first criteria is not met, perform an intermediate placement design;
      program instructions to determine whether a second criteria is met based on the intermediate placement design, wherein the second criteria comprises a second predefined threshold;
      program instructions to, in response to determining that the second criteria is met, initiate a second checkpoint procedure, wherein the second checkpoint procedure comprises:
         program instructions to gather a list of arrival times (ATs) and a list of expected time of arrival (ETA) for the group of macros;
         program instructions to perform pin list filtering to create a second shortened pin list; and
         program instructions to calculate an average and a standard deviation of the list of ATs and the list of ETA; and
      program instructions to perform design iterations using at least the first shortened pin list or the second shortened pin list if the first threshold or the second threshold is met respectively instead of an unfiltered pin list, to reach a final optimized stage, wherein the design iterations include: a detailed routability metrics evaluation, a buffering update, clocking and power related checks, and a fix-up of reliability issues.

* * * * *